United States Patent
Asakura

(10) Patent No.: US 7,393,222 B2
(45) Date of Patent: Jul. 1, 2008

(54) ROTATABLE CONNECTOR

(75) Inventor: Toshiaki Asakura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/774,960

(22) Filed: Jul. 9, 2007

(65) Prior Publication Data

US 2008/0014776 A1    Jan. 17, 2008

(30) Foreign Application Priority Data

Jul. 13, 2006    (JP) ............... 2006-193090

(51) Int. Cl.
*H01R 35/04* (2006.01)
(52) U.S. Cl. ........................... 439/164; 439/15
(58) Field of Classification Search ............... 439/164, 439/15

See application file for complete search history.

(56) References Cited

U.S. PATENT DOCUMENTS

| | | | |
|---|---|---|---|
| 5,980,286 A * | 11/1999 | Best et al. | 439/164 |
| 6,302,716 B1 | 10/2001 | Matsumoto et al. | |
| 6,354,854 B1 * | 3/2002 | Matsuzaki | 439/164 |
| 6,494,396 B2 * | 12/2002 | Sugata | 242/388.5 |
| 2004/0067670 A1 * | 4/2004 | Rhein et al. | 439/164 |

FOREIGN PATENT DOCUMENTS

| | | |
|---|---|---|
| DE | 43 29 820 A1 | 3/1994 |
| DE | 10 2005 002 676 | 6/2006 |
| EP | 1 463 164 A2 | 9/2004 |
| WO | WO 01/08272 A1 | 2/2001 |

OTHER PUBLICATIONS

Search Report for corresponding European Patent Application Serial No. 07013393.9-2214 dated Sep. 17, 2007.

* cited by examiner

*Primary Examiner*—Tho D Ta
(74) *Attorney, Agent, or Firm*—Brinks Hofer Gilson & Lione

(57) ABSTRACT

A rotatable connector includes a stator having an outer cylindrical portion; a rotor having an inner cylindrical portion and rotatably supported by the stator; three or more flat cables received in an annular space defined between the outer cylindrical portion and the inner cylindrical portion, the winding direction of each flat cable being halfway reversed, and opposite ends of each flat cable being fixed to the stator and the rotor, respectively; and a holder rotatably disposed in the annular space and having three or more openings through which the reversed portions of the flat cables pass. A width in the circumferential direction of a first opening is set smaller than a width in the circumferential direction of a second opening different from the first opening, and a bending strength of the flat cable passing through the first opening is set greater than that of the other flat cables.

5 Claims, 3 Drawing Sheets

ROTATABLE CONNECTOR

RELATED APPLICATIONS

This application claims the priority of priority under 35 U.S.C. § 119 to Japanese Patent Application No. 2006-193090, filed on Jul. 13, 2006, which is hereby incorporated by reference.

BACKGROUND

1. Field of the Disclosure

The present disclosure relates to a rotatable connector that is incorporated in an automobile steering system for electrical connection of an airbag system. More particularly, the disclosure relates to a rotatable connector in which three or more flat cables are received in an annular space defined between a stator member (hereinafter "stator") and a rotor member (hereinafter "rotor") in a state that the winding direction of each flat cable is reversed via a reversed portion.

2. Description of the Related Art

In a conventional rotatable connector, a rotor having an inner cylindrical portion is rotatably supported by a stator having an outer cylindrical portion. In the rotatable connector, flat cables are wound and received in an annular space between the outer cylindrical portion and the inner cylindrical portion. The rotatable connector is used as means for providing electrical connection to an airbag system, an inflator, or the like that are built in a steering wheel having a limited number of rotations, which is incorporated in an automobile steering system. The flat cables are made of a band-shaped member having a conductor contained in an insulating film. Two types of rotatable connectors are known. One is wound in a spiral form and the other is wound in a halfway reversed form. The reversed type rotatable connecter, can be made substantially shorter than the spiral form type. Therefore, the reversed type rotatable connector is widespread. The reversed type rotatable connector normally has one flat cable. Recently, a rotatable connector has been proposed in which a conductor is divided into several pieces corresponding to two or more flat cables in order to cope with a trend toward a multi-circuit configuration. Such a rotatable connector is disclosed in JP-A-10-116672, for example.

FIG. 4 is a top plan view of a known rotatable connector disclosed in JP-A-10-116672. The rotatable connector includes a stator 100 having an outer cylindrical portion 100a, a rotor 101 having an inner cylindrical portion 101a and that is rotatably supported at the central position of the stator 100. A ring-shaped holder 103 is rotatably disposed in an annular space 102 between the outer cylindrical portion 100a and the inner cylindrical portion 101a, and first and second flat cables 104 and 105 received in the annular space 102 such that a winding direction of each cable is halfway reversed. In the holder 103, a pair of stationary tubes 106 is erected, a plurality of rollers 107 are rotatably supported, and the stationary tubes 106 are opposed to each other across the holder 103 while maintaining a predetermined gap with respect to one of the rollers 107 in the circumferential direction. A first opening 108 is defined in a gap between one of the stationary tubes 106 and the roller 107 opposite the one stationary tube 106. A second opening 109 is defined in a gap between the other stationary tube 106 and the roller 107 opposite the other stationary tube 106. A width in the circumferential direction of the first opening 108 is set smaller than a width in the circumferential direction of the second opening 109.

The first flat cable 104 and the second flat cable 105 are made of a band-shaped member having a plurality of conductors contained in an insulating film such as polyethylene terephthalate (PET) or other polyester films. In the drawing, the first flat cable 104 is shaded with black and the second flat cable 105 is unshaded, for convenience. The outer end of each of the flat cables 104 and 105 is connected to a stationary joint 110 provided in the outer cylindrical portion 100a and is electrically led out from the stator 100 to the outside through the stationary joint 110. In addition, the inner end of each of the flat cables 104 and 105 is connected to a movable joint 111 and is electrically led out from the rotor 101 to the outside through the movable joint 111.

In a state in which the first flat cable 104 is disposed on the outer side, the flat cables 104 and 105 are wound around an inner peripheral wall of the outer cylindrical portion 100a in a counterclockwise direction from the stationary joint 110. Then, the flat cables 104 and 105 are branched off. Specifically, the first flat cable 104 passes through the first opening 108 with a small width, and is reversely wound in a U shape around one of the rollers 107 (this portion of the flat cable will be referred to as reversed portion 104a). Meanwhile, the second flat cable 105 passes through the second opening 109 with a large width, and is reversely wound in a U shape around another roller 107 (this portion of the flat cable will be referred to as reversed portion 105a). Then, the first and second flat cables 104 and 105 are wound around an outer peripheral wall of the inner cylindrical portion 101a in a clockwise direction such that the second flat cable 105 is disposed on the outer side. Then, the flat cables 104 and 105 are led to the movable joint 111 and are received in the annular space 102.

In the rotatable connector having such a configuration, when the rotor 101 rotates in a counterclockwise direction from a neutral position (direction of arrow A), the reversed portions 104a and 105a of the first and second flat cables 104 and 105 move in the arrow A direction by an amount smaller than the rotation amount of the rotor 101. Then, the holder 103 also moves in the arrow A direction accompanied by the movement of the reversed portions 104a and 105a. As a result, the flat cables 104 and 105 are led out from the outer peripheral wall of the inner cylindrical portion 100a by an amount approximately twice as long as the movement of the reversed portions. Then, the flat cables are wound around the inner peripheral wall of the outer peripheral portion 101a. In this case, the reversed portion 105a of the second flat cable 105 having a large-diameter winding portion moves faster than the reversed portion 104a of the first flat cable 104 having a small-diameter winding portion. As mentioned above, however, since the width of the first opening 108 is smaller than that of the second opening 109, the reversed portions 104a and 105a press the stationary tube 106 facing each of the openings 108 and 109, and the holder 103 receives the pressing force from the reversed portions 104a and 105a. Accordingly, the holder 103 rotates in the annular space 102 in the arrow A direction.

To the contrary, when the rotor 101 rotates in a clockwise direction from the neutral position (arrow B direction), the reversed portions 104a and 105a of the flat cables 104 and 105 move in the arrow B direction by an amount smaller than the rotation amount of the rotor 101. The holder 103 also moves in the arrow B direction accompanied by the movement of the reversed portions 104a and 105a. As a result, the flat cables 104 and 105 are led from the inner peripheral wall of the outer cylindrical portion 100a by an amount approximately twice as long as the amount of the movement of the reversed portions 104a and 105a. Then, the flat cables are wound around the outer peripheral wall of the inner cylindrical portion 101a. In this case, the reversed portion 105a of the second flat cable 105 having a large-diameter winding portion moves faster than the reversed portion 104a of the first flat cable 104 having a small-diameter winding portion. However, since the width of the first opening 108 is set smaller than that of the second opening 109, the reversed portions 104a and 105a attract the roller 107 facing each of the openings 108 and 109, and the holder 103 receives the attracting force from the reversed portions 104a and 105a. Accordingly, the holder 103 rotates in the annular space 102 in the arrow B direction.

In the known rotational connector described above, when the rotor 101 rotates in the arrow A direction and the flat cables 104 and 105 are wound around the inner peripheral side wall of the outer cylindrical portion 10a, an output force is continuously generated in the arrow F direction in FIG. 5 at a contact portion with the roller 107 of the first flat cable 104 passing through the first opening 108. Among the components of the output force F indicated by the arrow Fx and the arrow Fy, the force component in the arrow Fx direction serves as a pressing force that allows the holder 103 to rotate. Meanwhile, the force component in the arrow Fy direction serves as a force that allows the reversed portion 104a of the first flat cable 104 to be pressed toward the outer cylindrical portion 100a side. Although the detailed descriptions thereof are omitted, the same statements are applicable to the case of the second flat cable 105 passing through the second opening 109. In addition, when the normal rewinding operation is performed, the component in the arrow Fx direction is greater than the force component in the arrow Fy direction. Accordingly, when the reversed portion 104a of the first flat cable 104 passes through the first opening 108, the reversed portion 104a presses the stationary tube 106 in a rotation direction (the arrow A direction). Similarly, when the reversed portion 105a of the second flat cable 105 passes the second opening 109, the reversed portion 105a presses the stationary tube 106 in a rotation direction. Accordingly, the holder 103 receives the pressing force from the reversed portions 104a and 105a and rotates smoothly in the arrow A direction.

However, in the known rotatable connector, it is difficult to set the respective widths of the openings so that the stationary tube facing the respective openings is pressed by the reversed portions when three or more flat cables rotate in a counterclockwise direction while reversing the winding directions at three or more openings. When the rotor rotates in a clockwise direction, it is difficult to set the respective widths of the openings so that the reversed portions of the respective flat cables attract the roller facing the respective openings. In addition, depending on the respective settings on the widths of the openings, driving forces applied to the holder from the reversed portion of the respective flat cables may be interfere with each other. Accordingly, it is difficult to perform the smooth winding operation and rewinding operation.

Accordingly, when the widths of the openings are set such that the holder is only driven by the reversed portion of the flat cable passing through the small-width opening, an excessive amount of stress is applied to the reversed portion of the flat cable passing through the small-width opening. In the small-width opening, a frictional resistance may increase excessively between the flat cable and the roller. Accordingly, the force component in the arrow Fx direction shown in FIG. 5 is lowered by the frictional resistance. As a result, the force component in the arrow Fy direction may be increased greater than the force component in the arrow Fx direction. Consequently, the movement of the reversed portion of the flat cable in the arrow A direction may be interrupted in the small-width passage. Thus the holder can not be driven smoothly. In the small-width passage in which the rotational movement of the reversed portion of the flat cable is interrupted, the reversed portion is forcibly inserted into a space of the opening. As a result, the flat cable is complexly bent, curved or buckled, or the conductor carried in an insulating film of the flat cable may be broken. Specifically, when an environment temperature increases to a high temperature, such a problem may occur frequently.

SUMMARY

The present disclosure solves the above-mentioned problems. An object of the disclosure is to provide a rotatable connector capable of realizing a smooth winding and rewinding operation even with three or more flat cables.

According to an aspect of the disclosure, a rotatable connector includes a stator having an outer cylindrical portion; a rotor having an inner cylindrical portion and rotatably supported by the stator; three or more flat cables received in an annular space defined between the outer cylindrical portion and the inner cylindrical portion, a winding direction of each flat cable being halfway reversed, and both ends of each flat cable being fixed to the stator and the rotor, respectively; and a holder rotatably disposed in the annular space and having three or more openings through which the reversed portions of the flat cables individually passes. A width in the circumferential direction of a first opening among the three or more openings is set smaller than a width in the circumferential direction of a second opening that is different from the first opening. The holder rotates in response to a pressing force applied from the flat cable passing through the first opening, and a bending strength of the flat cable passing through the first opening is set greater than those of the other flat cables passing through the openings other than the first opening.

A bending strength of the cable is set greater than that of the flat cable passing through the second opening. With such a configuration, it is possible that the flat cable passing through the first opening is prevented from buckling so that the holder is smoothly operated. Accordingly, even when three or more flat cables are used, it is possible to create a rotatable connector capable of realizing a smooth winding and rewinding operation. In addition, the rotatable connector may be securely used in high-temperature environments.

With such a configuration, an insulation film of the flat cable passing through the first opening can be made of a material in which it is difficult to prevent it from buckling more than that of the flat cables passing through the second opening. However, when all the flat cables are formed of the same materials and a thickness of a flat cable passing through the first opening is set greater than those of the flat cables passing through the second opening, it is possible to make uniform a frictional resistance between the respective flat cables.

In the rotatable connector, when the widths in the circumferential direction of the second opening are set greater than the width in the circumferential direction of the first opening by 4.5 times or more, a force applied to the holder from the reversed portion of three or more flat cables is not interposed to each other. With such a configuration, it is possible to create a rotatable connector capable of realizing a smooth winding and rewinding operation.

The rotatable connector of the disclosure includes a flat cable which passes through the first opening and applies a pressing force to the holder in a rotatable direction among three or more flat cables, and a bending strength of the flat cable is set greater than that of the flat cables passing through the other openings. With such a configuration, it is possible to prevent the flat cable from buckling and operate smoothly the holder. In addition, the rotatable connector may be securely used in high-temperature environments.

BRIEF DESCRIPTION OF THE DRAWINGS

The above and other features and advantages of the present disclosure will become more apparent by describing in detail exemplary embodiments thereof with reference to the attached drawings in which.

DESCRIPTION OF THE PREFERRED EMBODIMENTS

Figure 1:
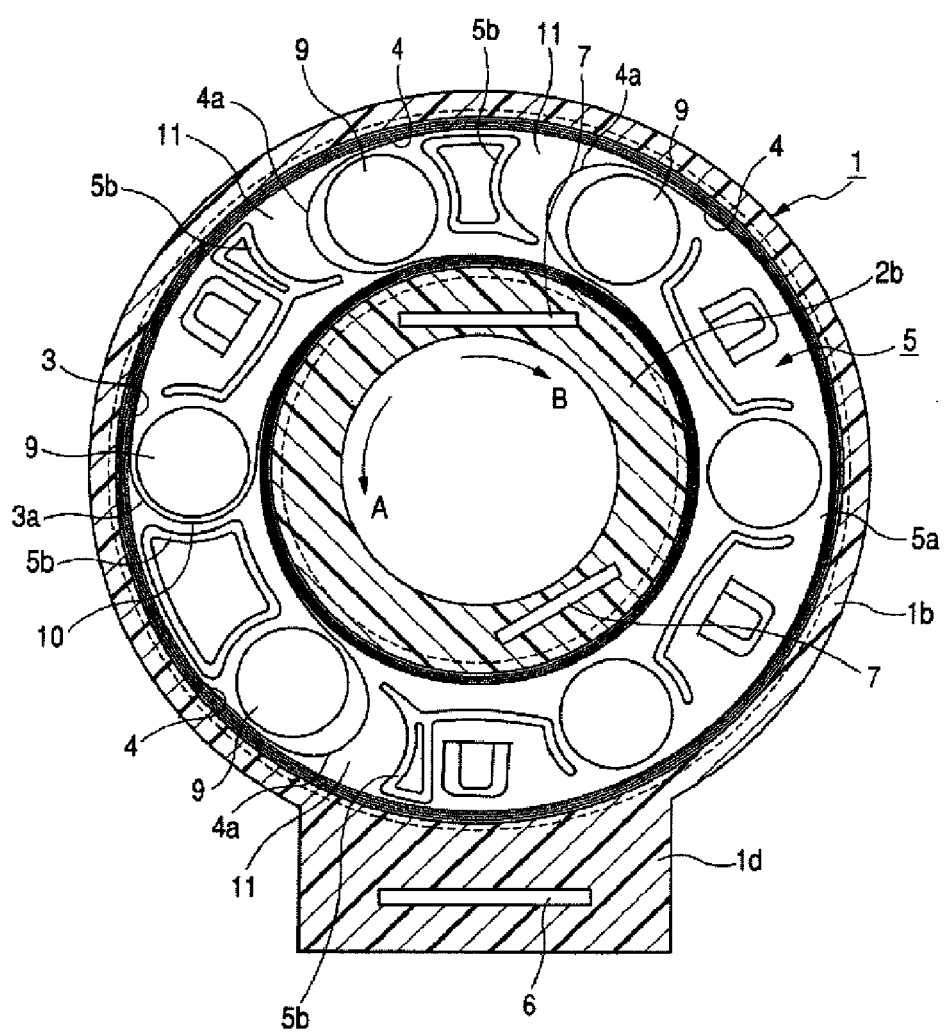
FIG. 1 is a transverse cross sectional view illustrating a rotatable connector according to an embodiment.
Figure 2:
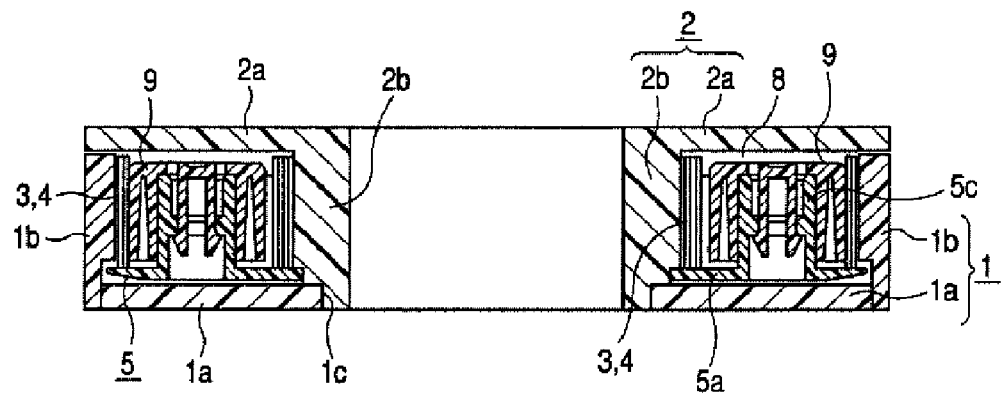
FIG. 2 is a longitudinal sectional view illustrating the rotatable connector according to the embodiment.
Figure 3A:
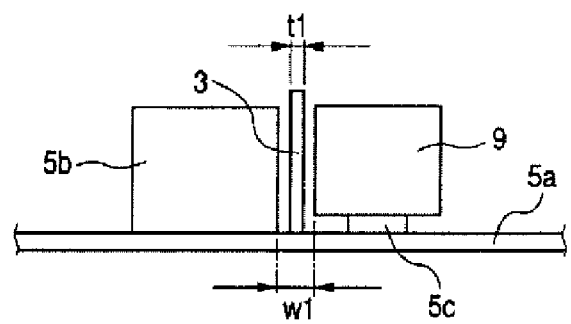
FIG. 3 is an explanation view illustrating a length relationship between a flat cable and an opening of a holder provided in the rotatable connector according to the embodiment.
Figure 3B:
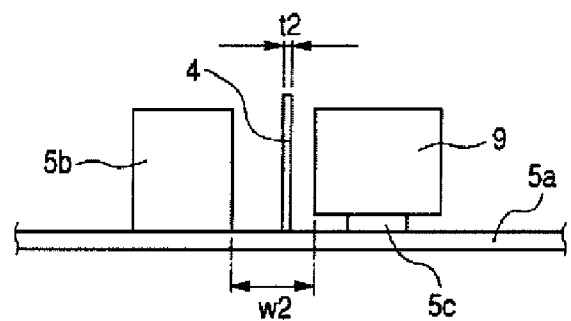
Figure 4:
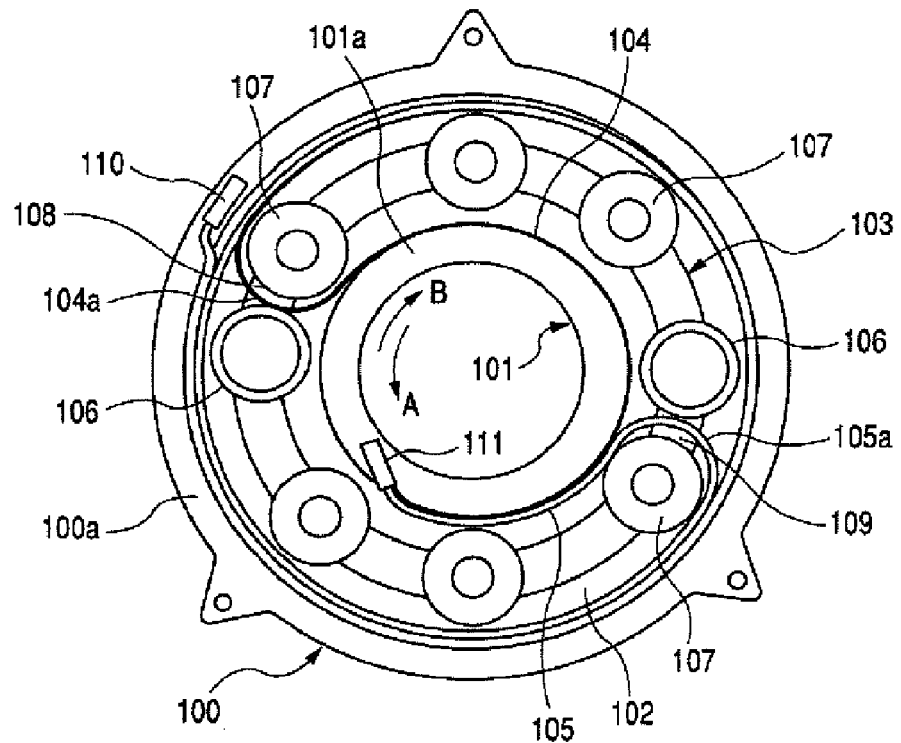
FIG. 4 is a plan view illustrating the rotatable connector according to the prior art.
Figure 5:
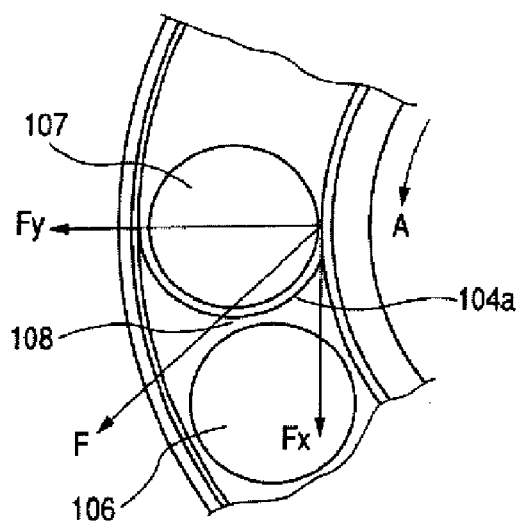
FIG. 5 is an explanation view illustrating a problem of a rotatable connector as proposed in the prior art.

Embodiments of the disclosure will be described with reference to the attached drawings. FIG. 1 is a transverse cross sectional view illustrating a rotation connector according to an embodiment. FIG. 2 is a longitudinal sectional view illustrating the rotation connector. FIG. 3 is an explanation view illustrating a length relationship between a flat cable and an opening of a holder, which is provided in the rotation connector.

A rotatable connector of the present embodiment includes a stator 1, a rotor 2 rotatably connected to the stator 1, flat cables 3, 4 connected between the stator 1 and the rotor 2, a holder 5 made of a synthetic resin, which is disposed in the inside of the stator 1 and the rotor 2.

The stator 1 is a fixed side provided in a steering column and includes a lower plate 1a of a synthetic resin and an outer cylindrical portion 1b which is an outer cylindrical portion. In the center of the lower plate 1a, a center hole 1c is formed, the outer cylindrical portion 1b is integrally formed in an outer peripheral edge of the lower plate 1a. In addition, in an outer peripheral surface of the outer cylindrical 1b, an extension portion 1d protruding from the outer edge is integrally formed and a stationary side joint 6 is provided in the inside of the extension portion 1d.

The rotor 2 is a movable and is integrally formed of a top plate portion 2a and an outer cylindrical portion 2b with a synthetic resin. The top plate 2a is formed of a ring shape so as to face the lower plate 1a and the inner cylindrical portion 2b droops front the center of the top plate 2a. The inner cylindrical portion 2b is of a length capable of being inserted into a steering shaft. A pair of movable joint 7 is provided in the inside of the inner cylindrical portion 2b. In addition, by inserting the center hole 1c of the lower portion of the inner cylindrical portion 2b, the rotor 2 is rotatably connected to the stator 1. With such a configuration, an annular space 8 having a ring shape is defined by the lower plate 1a of the stator 1, the top plate 2a of the rotor 2 of the outer cylindrical portion 1b, and by the inner cylindrical portion 2b.

Each of the flat cables 3, 4 is a band-shaped member in which a conductor is contained in an insulating film made of polyethylene terephthalate (PET). The respective flat cables 3 and 4 are stored in an opposite direction in the annular space 8 through the U-shaped reversed portions 3a and 4a. However, a thickness t1 of the flat cable 3 is set approximately two times thicker than a thickness t2 of the flat cables 4 (for example of the embodiment, t1=0.22 mm, t2=0.11 mm). With such a configuration, a bending strength of the flat cable 3 (an elastic limit) is set sufficiently greater than those of the flat cables 4. The outer end portion of the respective cables 3 and 4 are connected to the stationary side joint 6 and are electrically connected to the outside of the stator 1 through the stationary side joint 6. In addition, an inner end portion of the respective flat cables 3 and 4 are divided into a pair of the movable joints 7 and are connected electrically to the outside of the rotor 2 through the movable joint 7.

The holder 5 includes an annular housing plate 5a mounted on the lower plate 1a of the stator 1, a plurality of guide walls 5b provided on the annular housing plate 5a, and a plurality of spindles 5c. In the respective spindles 5c, a roller 9 is rotatably supported. One of a plurality of rollers 9 faces the guide wall 5b through the first opening 10 and the reversed portion 3a of the flat cable 3 is disposed in the inside of the first opening 10. In addition, the other three rollers 9 are each opposite to the guide wall 5b through the second opening 11. The respective reversed portions 4a of three flat cables 4 are also disposed in the second opening 11. Herein, when a width w1 of a circumferential direction of the first opening 10 is set to a width w2 of a circumferential direction of the second opening 11, w1 is set sufficiently smaller than w2 (in one exemplary embodiment, w1=2 mm, w2=11 mm). With such a configuration, when the rotor 2 rotates in the arrow A direction (FIG. 1), only the reversed portion 3a of the flat cable 3 presses the guide wall 5b in the rotatable direction.

In the embodiment, the width w2 of the second opening 11 is set to be 5.5 times than the width w1 of the first opening 10. However, the width w2 may be set to be 4.5 times or greater than the width w1 for best results, but may be set to be less than 4.5 times the width w1. Accordingly, when the rotor 2 rotates in a counterclockwise direction, the reversed portion 3a of the flat cable 3 passing through the first opening 10 presses the guide wall 5b so as to operate the holder 5. However, a part of the reversed portion 4a of the flat cable 4 comes in contact with the roller 9 facing the second opening 11 and the reversed portion 3a of the flat cable 3 operates in a direction opposite to an operation direction of the holder 5. Accordingly, the rotation of the holder 5 may not be smoothly performed. In addition, when the rotor 2 rotes in a clockwise direction, the reversed portion 3a of the flat cable 3 passing through the first opening 10 is pulled so as to move the holder 5. However, a part of the reversed portion 4a of the flat cable 4 comes in contact with the guide wall 5b and the reversed portion 3a of the flat cable 3 moves in a direction opposite to an operation direction of the holder 5. Accordingly, the rotation of the holder 5 may not be smoothly performed.

In the rotatable connector as described above, the stator 1 is installed within a steering column, the rotatable connector is mounted in a steering device of an automobile such that the rotor 2 is connected to a handle (not shown). The rotatable connector is used as electrical connecting means of an air bag inflator or a horn circuit mounted on the steering wheel of the automobile. When a driver handles the steering wheel in a clockwise direction or a counterclockwise direction, the rotation force is delivered to the rotor 2. Accordingly, the rotor 2 rotates in the clockwise direction or the counterclockwise direction.

For example, when the rotor 2 rotates in the counterclockwise direction (arrow A in FIG. 1) from the neutral position, the reversed portions 3a and 4a of all the flat cables 3 and 4 move in the arrow A direction by a smaller amount of rotation than the rotor 2. The holder 5 moves in the arrow A direction following the reversed portions 3a and 4a. At this time, the reversed portion 3a of the flat cable 3 passing through the first opening 10 comes in contact with the guide wall 5b. However, the respective portions 4a of the three flat cables 4 passing through the second opening 11 do not come in contact with the guide walls 5b. Accordingly, the holder 5 receives the pressing force from the reversed portion 3a of the flat cable 3 so as to rotate in the annular space 8 in the arrow A direction. As a result, the flat cables 3 and 4 are fed out approximately twice as long as the counterclockwise movement from the outer peripheral wall of the inner cylindrical portion 2b, being wound on the inner peripheral wall side of the outer peripheral portion 1b.

Conversely to the above-described, when the rotor 2 turns clockwise from the neutral position (arrow B in FIG. 1), the reversed portions 3a and 4a of the flat cables 3 and 4 move in the arrow B direction by a smaller amount of rotation than the rotor 2, and accordingly, the holder 5 follows the movement of the reversed portions 3a and 4a, and moves in the arrow B direction. In this case, the reversed portions 3a and 4a are looped to the roller 9 so as to be wound around the outer peripheral wall of the inner cylindrical portion 2b. The holder 5 receives a force only from the reversed portion 3a and moves in the annular space 8 in the arrow B direction. Consequently, the flat cables 3 and 4 are fed out about twice as long as the amount of movement of the reversed portions 3a and 4a from the inner peripheral wall side of the outer cylindrical portion 1b, being wound around the outer peripheral wall of the inner cylindrical portion 2b.

In the rotatable connector according to the embodiment, a flat cable 3 passing through the first opening 10 comes in contact with the guide wall 5b or the roller 9 so as to apply the pressing force in the rotatable direction to the holder 5 as the flat cable 3. However, the other three large-width flat cables that pass through the second opening 11 do not come in contact with the guide wall 5b. Since the flat cable 3 is made of the same material as the flat cable 4 and has a thickness of two times that of the flat cable 4, a flat cable 3 has a greater bending strength (an elastic limit) than that of the flat cables 4. Accordingly, as a frictional force between the flat cable 3 and the roller 9 increases and a force that pushes the reversed portion 3a toward the inner peripheral wall of the outer cylindrical portion 1b is more than a pressing force to the traveling direction of the reversed portion 3a when the rotor 2 rotates in the arrow A direction; and, as the flat cables 3 and 4 are wound around the inner peripheral wall of the outer cylindrical portion 1b, it is possible to prevent the flat cable 3 from buckling and the holder 5 moves smoothly in the rotatable direction. In this case, the reversed portion 4a of the flat cable 4 passes through the second opening 11 by the rotation of the holder 5 so as to be surely wound around the inner peripheral wall side of the outer cylindrical portion 1b. With such a configuration, even when four flat cables 3 and 4 are used, it is possible to realize smooth winding and rewinding operation. In addition, the rotatable connector may be securely used under a high-temperature environment.

In addition, the disclosure may be applied to a rotatable connector by using one flat cable passing through the first opening and two flat cables passing through the second openings, respectively.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

What is claimed is:

1. A rotatable connector comprising:
   a stator having an outer cylindrical portion;
   a rotor having an inner cylindrical portion and rotatably supported by the stator;
   three or more flat cables received in an annular space defined between the outer cylindrical portion and the inner cylindrical portion, a winding direction of each flat cable being halfway reversed, and opposite ends of each flat cable being fixed to the stator and the rotor, respectively; and
   a holder rotatably disposed in the annular space and having three or more openings through which the reversed portions of the flat cables pass,
   wherein a width in the circumferential direction of a first opening among the three or more openings is set smaller than a width in the circumferential direction of a second opening different from the first opening, and a bending strength of the flat cable passing through the first opening is set greater than that of the other flat cables passing through the openings other than the first opening.

2. The rotatable connection according to claim 1, wherein the holder rotates in response to a pressing force applied from the flat cable passing through the first opening.

3. The rotatable connector according to claim 2, wherein the width in the circumferential direction of the second opening is at least 4.5 times greater than the width in the circumferential direction of the first opening.

4. The rotatable connector according to claim 2, wherein the flat cables are made of a band-shaped member having a conductor contained in an insulating film made of the same material, and wherein a thickness of the flat cable passing through the first opening is set greater than that of the other flat cables passing through the opening other than the first opening.

5. The rotatable connector according to claim 3, wherein the width in the circumferential direction of the second opening is at least 4.5 times greater than the width in the circumferential direction of the first opening.

* * * * *